United States Patent [19]

Frantz

[11] Patent Number: 4,891,051
[45] Date of Patent: Jan. 2, 1990

[54] SYSTEM FOR DECONTAMINATING COMPRESSED GAS

[75] Inventor: Virgil L. Frantz, Salem, Va.
[73] Assignee: Roanoke College, Salem, Va.
[21] Appl. No.: 295,528
[22] Filed: Jan. 11, 1989
[51] Int. Cl.⁴ .............................................. B01D 53/04
[52] U.S. Cl. ...................................... 55/162; 55/179; 55/316; 55/389; 55/475; 55/DIG. 17; 55/DIG. 25
[58] Field of Search ................. 55/162, 163, 179, 271, 55/316, 389, 475, DIG. 17, DIG. 25

[56] References Cited

U.S. PATENT DOCUMENTS

| | | |
|---|---|---|
| 2,783,547 | 3/1957 | Bieger et al. ............... 55/162 X |
| 3,323,292 | 6/1967 | Brown ......................... 55/162 |
| 3,338,032 | 8/1967 | Siewert ....................... 55/162 |
| 3,365,861 | 1/1968 | Crowley et al. ............. 55/162 |
| 3,507,097 | 4/1970 | Crowley et al. ............. 55/162 |
| 3,902,875 | 9/1975 | Bridigum et al. ............ 55/162 |
| 4,108,617 | 8/1978 | Frantz ......................... 55/162 |
| 4,113,451 | 9/1978 | Frantz ......................... 55/162 |
| 4,247,311 | 1/1981 | Seibert et al. ............... 55/162 |
| 4,468,239 | 8/1984 | Frantz ......................... 55/162 |
| 4,496,376 | 1/1985 | Hradek ...................... 55/179 X |
| 4,512,781 | 4/1985 | Caralli et al. .............. 55/179 X |
| 4,519,819 | 5/1985 | Frantz ......................... 55/162 |
| 4,584,001 | 4/1986 | Dechene ..................... 55/179 X |
| 4,692,175 | 9/1987 | Frantz ..................... 55/DIG. 17 |
| 4,698,075 | 10/1987 | Dechene ................... 55/179 X |
| 4,802,899 | 2/1989 | Vrana et al. ............... 55/179 X |

FOREIGN PATENT DOCUMENTS

| | | | |
|---|---|---|---|
| 0073895 | 3/1983 | European Pat. Off. ............. 55/179 |
| 3533893 | 3/1987 | Fed. Rep. of Germany ........ 55/179 |

Primary Examiner—Robert Spitzer
Attorney, Agent, or Firm—Wilmer Mechlin

[57] ABSTRACT

A system for decontaminating compressed gas having twin particulate desiccant-containing towers and a two-stage coalescer-containing precoalescer upstream of and connected to the towers by an inlet manifold, each tower having a pneumatically actuated inlet valve and a solenoid valve in the inlet manifold and an outlet valve in a common outlet manifold, the towers and precoalescer each having a drain valve and containing in a lower part an upwardly acting compactor for respectively compacting the desiccant and preventing oil leakage, the towers above a predetermined pressure of gas from the precoalescer and under control of the solenoid valves and a timer each alternating between decontaminating and regenerating cycles and together alternating in decontaminating cycles for continuously supplying decontaminated gas to the outlet manifold, and the outlet manifold in turn supplying decontaminated gas as actuating gas to each of the valves and compactors.

6 Claims, 3 Drawing Sheets

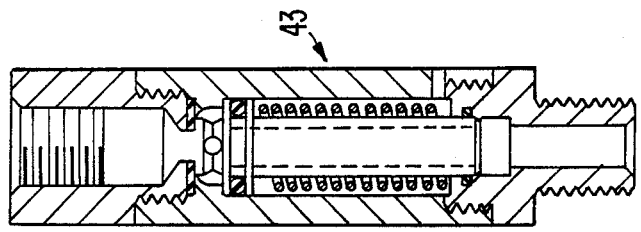
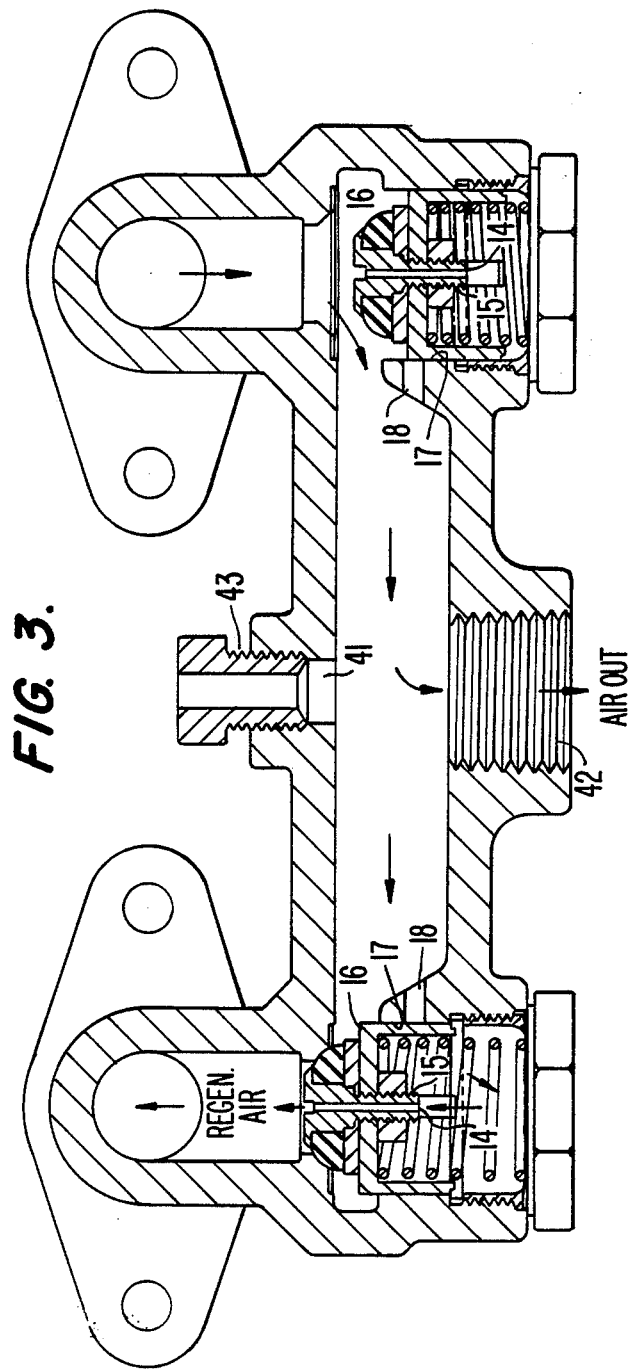

SYSTEM FOR DECONTAMINATING COMPRESSED GAS

BACKGROUND OF THE INVENTION

The prior art most pertinent to the present invention are my U.S. Pat. Nos. 4,468,239 ('239), 4,519,819 ('819) and 4,692,175 ('175). Of these patents, '239 discloses a twin tower assembly for decontaminating compressed gas in which the towers under solenoid valve and timer control of their several valves, each alternate between and together alternate in decontaminating and regenerating cycles for producing at a common outlet a constant supply of decontaminated gas. Patent '819 adds to the '239 assembly upstream of the towers a single stage precoalescer for receiving and, by coalescing, removing liquid and aerosol oil and water from contamined gas. In patent '175 the precoalescer of patent '819 is replaced by a two-stage precoalescer that removes from contaminated gas in a first stage solids and free or liquid oil and water and in a second stage oil and water aerosols, before they can reach and contaminate, clog or foul a particulate desiccant contained in the towers for absorbing moisture.

The solenoid valves of the towers are suspended from their common outlet manifold and inlet, and outlet and drain valves of each tower are opened and/or closed by actuating gas drawn as decontaminated gas from the outlet manifold. Contained in the towers in canisters, the particulate desiccant is maintained compact by a downwardly acting compactor in the upper part of each tower and actuated by decontaminated gas in that part during the tower's decontaminating cycle, while the precoalescer compensates for manufacturing tolerances by a spring acting downwardly on a canister containing its coalescers.

The present invention is particularly concerned with improving upon a twin tower-precoalescer system for decontaminating compressed gas.

SUMMARY OF THE INVENTION

The primary object of the present invention is to provide an improved system for decontaminating compressed gas having particulate desiccant-containing twin towers and a precoalescer upstream of and connected to the towers by an inlet manifold, the towers alternating in supplying decontaminated compressed gas constantly to a common outlet, and an upwardly acting compactor in each of the towers and precoalescer and actuated by decontaminated gas from the outlet from respectively compacting the desiccant and preventing oil leakage from the precoalescer.

Another object of the invention is to provide an improved system for decontaminating compressed gas having particulate desiccant-containing twin towers and a two-stage precoalescer upstream of and connected to the towers by an inlet manifold, each tower having inlet, outlet, drain and solenoid valves, whereof the inlet valves are in and solenoid valves are on the inlet manifold and the outlet valves are in a common outlet manifold, the towers on energizing of said solenoids in response to a predetermined minimum gas pressure and under timer control alternating in decontaminating cycles for continuously supplying decontaminated gas to the outlet manifold and the precoalescer separating liquid and vapor oil and water from incoming compressed gas in advance of the towers, and an upwardly acting compactor in each of the towers and precoalescer and actuated by decontaminated compressed gas from the outlet manifold for respectively compacting the desiccant and preventing oil leakage from the precoalescer.

An additional object of the invention is to provide an improved system for decontaminating compressed gas having twin desiccant-containing towers and a precoalescer upstream of the towers for receiving contaminated gas from a source and after separating therefrom by coalescing oil and gas liquids and aerosols, passing the gas to an inlet manifold of said towers, each tower having in said manifold one of a pair of oppositely acting axially aligned penumatically actuated inlet valves and on said manifold outwardly of and coaxial with said inlet valves one of a pair of solenoid valves, said inlet valves being opened by gas from said precoalescer and after said gas reaches a predetermined pressure alternately closed by timer-controlled alternate energizing of said solenoid valves for applying to said inlet valves as actuating gas decontaminated gas received from an outlet manifold of said towers.

A further object of the invention is to provide an improved system for decontaminating compressed gas having twin desiccant containing towers each alternating between and together alternating in decontaminating and regenerating cycles, whereof an outlet manifold connected to outlets of said towers contains for each tower at opposite ends of a passage between said outlets a gas opened spring closed outlet valve having when closed in a tower's regenerating cycle a restricted axial bore for regulating the pressure and flow rate of regenerating gas passed to the tower and received as decontaminated gas from the other tower in the latter's decontaminating cycle.

Another object of the invention is to provide a gas decontaminating system according to the immediately preceeding object, wherein each outlet valve when open telescopes into a cavity in a plug screwed into an aligned opening in the outlet manifold, and the restricted bore is formed in one of a plurality of interchangeable valve cores having bores of different diameter and selectively insertable in the valve for varying the pressure and flow rate of the gas passed to the tower being regenerated.

A further object of the invention is to provide a gas decontaminating system according to the primary object, wherein the towers contain a particulate desiccant and the precoalescer coalescer media in canisters, each of the towers and precoalescer has in and integral with a lower part an upwardly opening chamber closed at the top by a cover plate, and each compactor has a piston riding in said chamber, a piston rod projecting upwardly from said piston through said cover plate and mounting at an upper end a spider engaging a floating follower, and decontaminated gas from an outlet manifold of said towers is fed to each piston chamber through a cross-fitting and check valve and bled therefrom by a normally capped bleed pin in the cross-fitting and engageable with the check valve.

The foregoing and other objects and advantages of the invention will appear hereafter in the detailed description, be particularly pointed out in the appended claims and be illustrated in the accompanying drawings, in which:

FIGURE DESCRIPTION

FIG. 3 is a fragmentary vertical sectional view on the scale of FIG. 2 of the outlet manifold of the system of FIG. 1;

FIG. 4 is a fragmentary vertical sectional view on the scale of FIG. 2 taken between lines 4—4 of FIG. 1; and FIG. 5 is a central vertical sectional view on the scale of FIGS. 2-4 of a pressure regulator preferred for use in the system.

DETAILED DESCRIPTION

Figure 1:
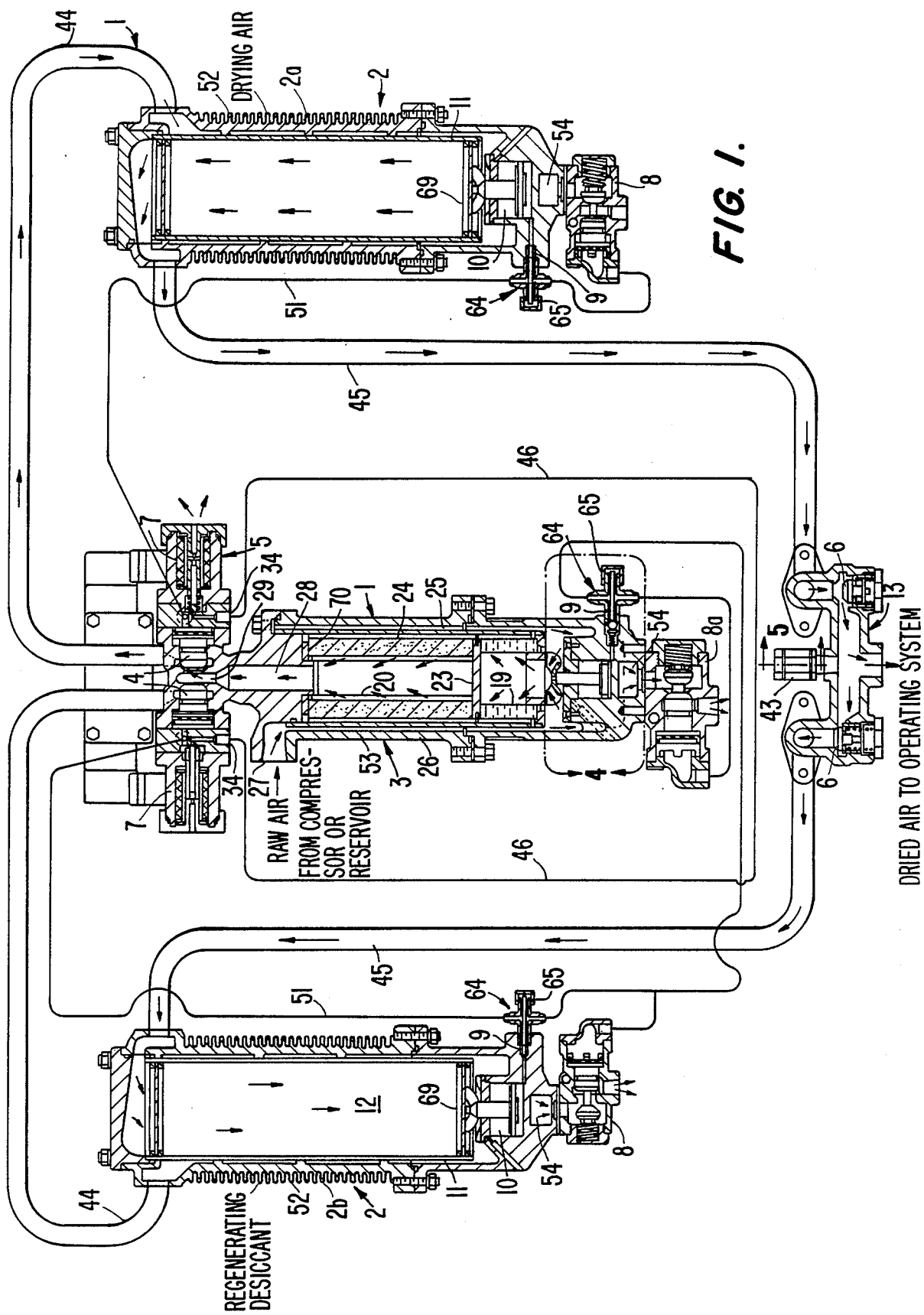
FIG. 1 is a schematic view of a preferred embodiment of the improved system of the present invention for decontaminating compressed gas showing the fluid connections in and flow paths of gas through the system.

Referring now in detail to the drawings in which like reference characters designate like parts, the improved compressed gas decontaminating system of the present invention, after an initial pump-up to 50 p.s.i. or other preselected minimum pressure, adapted to produce from contaminated compressed gas a continuous supply of decontaminated compressed gas.

Particularly designed for decontaminating compressed gas in the form of air contaminated by various phases of water and oil, the system of the present invention, designated as 1, is comprised of twin desiccant-containing towers 2 and a precoalescer 3, the latter preferably a two-stage precoalescer, initially receiving contaminated compressed gas from a compressor or other source and, as is the precoalescer of patent '175, preferably two-stage, for filtering, coalescing and separating from the contaminated gas loose or liquid oil and water in a first stage and oil and water aerosol or vapor in a second stage.

Now essentially oil free, the compressed air is passed from the precoalescer 3 to the twin towers 2 through inlet valves 4 in the towers' common inlet or intake manifold 5. In addition each tower 2 has an outlet valve 6 and a solenoid valve 7 and the towers and the precoalescer 3 each have a drain valve numbered 8 for the towers and 8as for the precoalescer and a check valve 9, the latter for actuating an internal upwardly acting compactor 10.

As do those of patent '239, the twin towers 2, each contain in a canister 11 a particulate desiccant 12, preferably a molecular sieve, for absorbing moisture from the gas passed thereto from the precoalescer 3. After the initial pump-up, during which both towers 2 pass gas to a common outlet manifold 13, the towers, by alternate energizing of their solenoid valves 7 under timer control, individually alternate between and together relatively alternate in decontaminating and regenerating cycles.

In the schematic flow diagram of FIG. 1, the right-hand tower 2a is in its decontaminating or drying cycle in which its inlet and outlet valves 4 and 6 are open and its drain valve 8 closed. Concurrently, the left-hand tower 2b is in its regenerating cycle in which its inlet and outlet valves 4 and 6 are closed, except for a restricted pressure-reducing axial bore 14 through the stem 15 of its outlet valve, and its drain valve 8 is open. As indicated in FIG. 3, the outlet valves 6 have skirts 16 fitting in guideways 17 in the outlet manifold, with the fit sufficiently loose to permit gas to pass through a radial port 18 in each guideway to and through the restricted bore 14 when the valve is closed.

Supplied through the outlet manifold 13 from the tower 2a then in its decontaminating cycle with a reverse flow of decontaminated gas reduced in pressure on passing through the restricted bore 14, the tower 2b has the molecular sieve desiccant 12 in its canister 11 exposesd to the relatively reduced pressure of the reverse-flowing regenerating gas. Having adsorbed moisture interiorly under relatively high pressure when in its decontaminating cycle, the desiccant 12 in the tower 2b, under the resultant pressure differential, will release internally entrained moisture for discharge with the gas through the tower's drain valve 8. If, as achievable with the present system, the regeneration suffices, the dew point of the output decontaminated gas from the outlet manifold 13 is reduced below the temperature to which the output gas will be exposed in service, thus protecting from corrosion devices operated by that gas, such as locomotive air brakes.

As previously mentioned, the precoalescer 3 is a two-stage precoalescer similar to that of patent '175 and the similarity extends to the disposition and composition of the coalescing media in the two stages. Thus, as shown in FIGS. 3 and 4 of patent '175, the coalescers of both stages are tubular or hollow cylindrical and disposed vertically in tandem, with the first or lower stage 19 preferably formed of knitted stainless steel wire mesh and the second or upper stage 20 a multilayered pleated or corrugated member sandwiching between outer and inner fiberglass coatings a plurality of coalescing layers of randomly arranged epoxy or other suitable resin-coated or bonded borosilicate fibers. Separated by an interposed imperforate disc 23, the lower and upper stage coalescers 19 and 20 are contained in a perforate inner sleeve or canister 24, in turn contained in an imperforate outer sleeve 25, between which and a side wall 26 of the prcoalescer 3 the contaminated source gas flows downwardly from the precoalaescer's inlet 27 to the inside of the lower coalescer, thence through that coalescer's side past the spacer disc 23 to and through the side of the upper coalescer. Now freed of oil and water in liquid and aerosol phases, the gas passes through an axial output passage 28 in the precoalescer 3 to an inlet port 29 of the inlet manifold 5.

Bracketed or straddled by axially aligned opposed valve seats 30 of the correspondingly aligned opposed inlet valves 4 of the twin towers 2, the inlet 29 leads or connects through the valve seats to the individual inlets 31 of the towers. Air or gas-actuated or opened and closed differential pistons, the inlet valves 4 have larger diameter piston heads 32 axially spaced outwardly of or from their valve heads 32a and riding in the inlet manifold 5 in actuating gas chambers 33. Actuating gas is supplied to the chambers 33 through actuating gas ports 34 leading through valve seats 35 to cavities or chambers 36 of the opposed or oppositely acting and aligned solenoid actuated valves 7. Mounted on or carried by the intake manifold 5, the solenoid actuated valves 7, on individual or separate energizing of their coils 37, individually retract their otherwise closed spring-urged plungers or armatures 38 from the seats 35 for flow of actuating gas through connecting passages 39 to the chambers 33 and by exerting pressure on the piston heads 32, selectively close the inlet valves.

Alternately energized by preferably polarized direct current supplied under control of a timer (not shown)

from an adjoining control box 40, the solenoid valves 7 will open and close but without effect on cycling of the towers 2 in absence of supply of actuating gas to the ports 34 of the inlet manifold 5. As shown in the flow diagram of FIG. 1, the source of the actuating gas supplied to the ports 34 is a valved outlet 41 of the outlet manifold 13 opposite the latter's outlet port 42 through which the improved system 1 supplies decontaminated gas to gas-operated devices. The preferred valving of the outlet 41 is a normally closed pressure regulator valve 43. Preset to open suitably under a pressure on the order of about 50 p.s.i., the regulator valve 43 will block flow of actuating gas to the ports 34 during pump-up of as associated compressor (not shown). In that interval the pressure of gas entering the inlet port 29 of the inlet manifold 5 from the precoalescer, since unresisted, will force open the inlet valves 4 of both towers 2 and, through inlet lines 44 from the inlets 31 and outlet lines 45, pass gas to and through both towers to the outlet manifold's outlet port 42, thus assuring during pump-up a maximum possible supply of gas for operating critical devices, such as air brakes. However, once the predetermined minimum opening pressure is reached, the pressure regulator valve 43 opens and supplies actuating as through the supply lines 46 to the ports 34 in the inlet manifold. Thereupon, the solenoid valves 7 take over and under timer control cause the towers 2 to cycle relatively in decontaminating and regenerating cycles and individually between such cycles.

Figure 2:
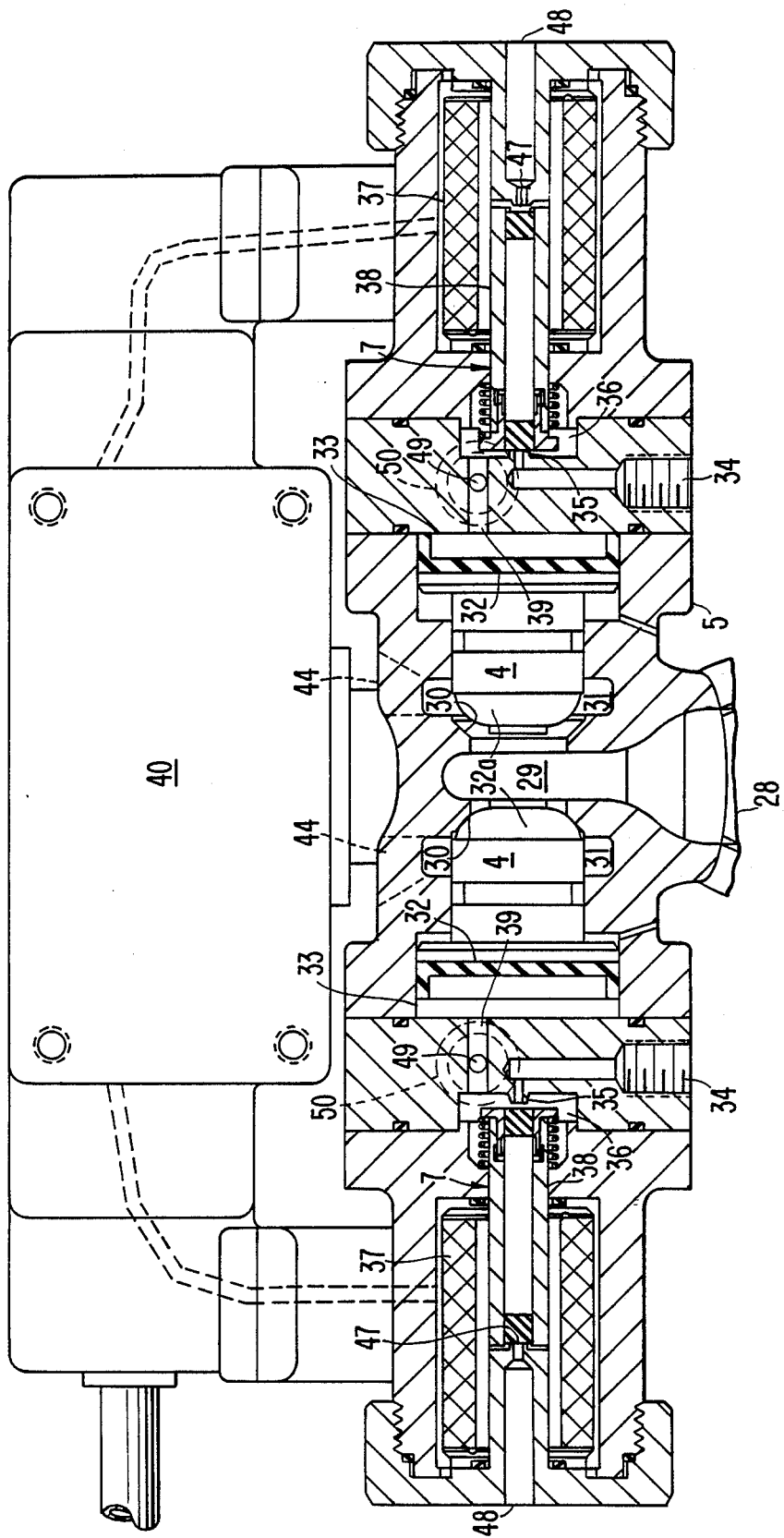
FIG. 2 is a fragmentary vertical sectional view on an enlarged scale of the intake manifold of the system of FIG. 1.

As indicated in FIG. 2, the plungers 38 of the solenoid valves 7 shuttle or reciprocate axially between the seats 35 and outer seats 47, the latter leading to bleed ports 48 through which actuating gas, after passing around the plunger, is drained on opening of the inlet valve of either tower 2 at the outset of its decontaminating or drying cycle.

FIG. 2 also shows in the inlet manifold 5 outwards of each inlet valve 4 a cross-drilling or passage 49 intersecting the passage 39 and supplied with actuating gas through the adjoining port 34 whenever the related or adjoining solenoid valve 7 is open and inlet valve 4 closed. Each of the cross-drillings 49 has outlets 50 at both ends, one of which is plugged, suitably the outlet obstructed or difficult of access in the particular installation. The outlets 50 at the exposed or available ends of the cross-drillings 49 are connected to as lines 51 supplying actuating gas to the drain valves 8 of the towers 2 and 8a of the precoalescer 3 and, through the check valves 9, the compactors 10 of both towers and precoalescers.

As previously explained, the drain valve 8 of each tower 2 is closed in the tower's decontaminating cycle and open in the regenerating cycle and suitably is a single-headed valve opened by gas pressure and closed by spring pressure. By contrast, the drain valve 8a of the precoalescer 3, as is ithe drain valve of patent '175, is a double-headed double-seated valve opened by gas pressure and closed by spring pressure and open only in the short intervals between opening and closing in which both heads are unseated. Tapped or connected in series to the line 51 supplying gas for actuating the drain valve 8 of either of the towers 2, here illustrated as the line for left-hand tower 2b being regenerated, the precoalescer drain valve 8a, under cyclic control of the system's timer, conveniently opens under gas pressure during each decontaminating cycle of the tower 2b in cycles of around 50 seconds. Exposed in the short intervals in which its drain valve 8a is open to both gravity drainage and a reverse flow of gas, the precoalescer 3 is purged of contaminants removed by the lower coalescer 19 and only infrequently requires removal and replacement of the upper coalescer 20.

A common feature of the towers 2 and precoalescer 3 is the provision in the lower part of the housing 52 of each tower and housing or casing 53 of the prcoalescer of the upwardly acting compactor 10. Subsequently identical, the compactors are illustrated by that of the precoalescer shown in FIG. 4. As there shown, each housing 52 or 53 has in its lower part above a sump 54 an integral upstanding abutment or shoulder 55 spaced at one or both sides from a side of the housing for enabling separated contaminants to flow downwardly therepast to the sump. The compactor 10 includes a piston 56 having a head 57 reciprocable vertically in an upwardly opening piston chamber 58 in the abutment 55. The chamber 58 is closed at the top by a removable cover late 59, through which the piston's rod 60 extends and mounts on its upper end a pressure head 61 suitably in the form of a three-legged spider. Actuating gas is supplied to the piston chamber 58 through the line 51 that also supplies the associated drain valve 8 or 8a, by mounting in a side port 62 an inner arm 63 of a cross-fitting 64. The opposite or outer arm 65 of the fitting 64 is capped, while the side port leads through a connecting passage 66 past the check valve 9 to the piston chamber 58 below the piston head 57. Actuating gas is supplied to the chamber 58 by leading or connecting the line 51 to and leading the gas through the fitting's remaining vertically aligned pair of arms 67 and bled as needed by tripping the check valve by a bleed pin 68 loosely fitting in the other horizontally aligned pair of arms 63 and 65.

Although structurally the same and actuated pneumatically, the compactors 10 serve a different purpose in the towers 2 than in the precoalescer 3. In the towers, the compactors, by applying through a floating follower 69 in the bottom part of the canister 11 a constant upward force on the contained particulate desiccant, minimize loss of the desiccant by dust-producing interabrasion, while the compactor in the precoalescer, by pressing the upper end of the perforate canister 24 against a gasket 70 around the outlet passage 28, prevents entrained oil from bypassing the coalescers 19 and 20.

From the above detailed description it will be apparent that there has been provided an improved compressed gas decontaminating system in which twin desiccant-containing towers, each alternate between and together relatively alternating in decontaminating and regenerating cycles, are combined with a two-stage coalescer-containing precoalescer upstream of and connected to an inlet port of an inlet manifold of the towers, the towers having in the inlet manifold a pair of gas-actuated inlet valves bracketing the inlet port and
- bracketed by a pair of solenoid valves one for each tower, the towers each having in an outlet manifold an outlet valve having a restricted bore for passing gas under reduced pressure, the towers and the precoalescer each having a drain valve and in a lower part thereof an upwardly acting compactor, a pressure regulator valve in an outlet of the outlet manifold and connected to actuating gas inlet ports of the inlet manifold for supplying actuating gas to said ports but blocking said supply when the gas pressure in the outlet manifold is below a predetermined minimum, and outlets in the inlet manifold and alternately openable under timer control on opening of the adjoining solenoid valve for alternately supplying actuating gas to the compactors of a tower and the precoalescer and opening the drain valves of the tower being regenerated and the precoalescer. The compressed gas for actuating all of the valves and the compactors is decontaminated gas supplied to the outlet manifold by the tower in its decontaminating or drying cycle except for the inlet valves which are opened either alternately or together by gas from the precoalescer.

It should be understood that the described and disclosed embodiment is merely exemplary of the invention and that all modifications are intended to be included that do not depart from the spirit of the invention and the scope of the appended claims.

Having now described my invention, I claim:

1. A system for decontaminating compressed gas, comprising twin desiccant-containing towers each alternatable between and relatively alternatable in decontaminating and regenerating cycles, a coalescer-containing precoalescer upstream and connected to an inlet port on an inlet manifold of the towers and alternatable between coalescing and purge cycles, a pair of inlet valves and a pair of solenoid valves in said manifold one for each tower, said towers having in a common outlet manifold an outlet valve having a restricted axial bore adapted when the valve is closed to pass gas under reduced pressure to the tower being regenerated, said towers and precoalescer each having a drain valve and in a lower part of a housing thereof an upwardly acting compactor supplied with actuating gas from an outlet in said inlet manifold, means for cycling said towers and precoalescer in response to timer-control of said solenoid valves, and means for preventing said cycling when the pressure of said gas is below a predetermined minimum.

2. A system according to claim 1, wherein the means for preventing said cycling is a pressure regular valve in an outlet of said outlet manifold and connected to actuating gas inlet ports of said inlet manifold.

3. A system for decontaminating compressed gas, comprising twin desiccant-containing towers each alternatable between and relatively alternatable in decontaminating and regenerating cycles, means for cycling said towers under timer control of alternately energized solenoid valves, a two-stage coalescer-containing precoalescer upstream and connected to an inlet port of an inlet manifold of said towers, each tower having in said inlet manifold one of a pair of oppositely acting and aligned inlet valves bracketing said inlet port and one of a pair of solenoid valves bracketing and aligned with said inlet valves, said towers each having in a common outlet manifold an outlet valve having therein a restricted opening operative when the valve is closed to pass gas under reduced pressure to the tower in its regenerating cycle, and a pressure regulator valve in an outlet of said outlet manifold and connected to actuating gas inlet ports of said inlet manifold for supplying actuating gas thereto when the pressure of the gas in the outlet manifold is above a predetermined minimum.

4. A system according to claim 3, wherein the inlet valves are differential pistons alternately openable by the pressure of gas from the precoalescer in the inlet port of the inlet manifold and closable by the pressure of decontaminated gas supplied from the outlet manifold to the actuating gas inlet ports of the inlet manifold.

5. A system according to claim 4, wherein the desiccant is a particulate desiccant and including a compressed gas actuated upwardly acting compactor in a lower part of a housing of each of said towers and precoalescer, said compactor in each tower on actuation compacting a particulate desiccant therein for minimizing loss of desiccant by dust-producing interabrasion, and said compactor in said precoalescer on actuation pressing a canister containing coalescers upwardly against a gasket about an outlet passage for preventing oil entrained in gas passed to the precoalescer from leaking past the coalescers.

6. A system according to claim 5, including for supplying actuating gas to the compactor of each tower and precoalescer a line from an outlet in the inlet manifold connected to a cross-fitting threaded into a side port in the housing of each of said towers and precoalescer and therebeyond to a drain valve of each of said towers or precoalescer, a pressure chamber of said compactor in said housing, a passage in said housing between said side port and pressure chamber, a check valve in and normally blocking egress of gas through said passage, and a bleed pin in said cross-fitting for tripping said check valve.

* * * * *